United States Patent
Owen et al.

(10) Patent No.: US 7,287,105 B1
(45) Date of Patent: Oct. 23, 2007

(54) ASYNCHRONOUS-MODE SYNC FIFO HAVING AUTOMATIC LOOKAHEAD AND DETERMINISTIC TESTER OPERATION

(75) Inventors: Jonathan Mercer Owen, Northboro, MA (US); Mark Douglas Hummel, Franklin, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 480 days.

(21) Appl. No.: 11/033,561

(22) Filed: Jan. 12, 2005

(51) Int. Cl.
*G11C 7/10* (2006.01)
*G06F 1/12* (2006.01)
*H04L 7/02* (2006.01)

(52) U.S. Cl. .................. 710/52; 710/61; 713/400; 375/354; 365/189.01; 365/189.08

(58) Field of Classification Search ............ None
See application file for complete search history.

(56) References Cited

U.S. PATENT DOCUMENTS

2002/0087909 A1    7/2002   Hummel et al.

OTHER PUBLICATIONS

"AMD-3181™ HyperTransport™ PCI-X® Tunnel Data Sheet", 24637 Rev. 3.02, Aug. 10, 2004, pp. 1-87.

*Primary Examiner*—Ilwoo Park
(74) *Attorney, Agent, or Firm*—Manelli Denison & Selter PLLC; Leon R. Turkevich

(57) ABSTRACT

Precise estimation of latency is attained based on identifying that a receive clock is configured to operate only at prescribed available frequencies. A receive buffer circuit includes buffer control logic configured for reading a selected number of the buffer entries based on a detected number of receive clock edges within one local clock cycle. Valid data is identified based on the number of clock edges exceeding a selected threshold. A selected pointer offset is obtained from a lookahead table, specifying multiple pointer offsets for accommodating latency encountered at respective prescribed available frequencies, based on matching the determined frequency to one of the prescribed available frequencies. The selected pointer offset is added to a read pointer to offset the latency encountered from edge detection.

12 Claims, 5 Drawing Sheets

| Available Frequency | Latency Index | |
|---|---|---|
| 200 MHz | 4 | 58a |
| 300 MHz | 6 | 58b |
| 400 MHz | 9 | 58c |
| 500 MHz | 11 | 58d |
| 600 MHz | 14 | 58e |
| 800 MHz | 18 | 58f |
| 1000 MHz | 20 | 58g |

Figure 5

ASYNCHRONOUS-MODE SYNC FIFO HAVING AUTOMATIC LOOKAHEAD AND DETERMINISTIC TESTER OPERATION

BACKGROUND OF THE INVENTION

1. Field of the Invention

The present invention relates to synchronization of data, and more particularly, to a low latency method of synchronizing high-speed data to a local clock domain, where the high-speed data passes from one clock domain, across an asynchronous boundary, and into the local clock domain, enabling receipt and transfer of the high-speed data within an integrated circuit according to a local clock.

2. Background Art

Newer communications systems require advanced processing of high speed digital signals in order to accommodate precise timing requirements. For example, processor-based communications systems utilize high speed bus architectures, such as HyperTransport™ bus architectures, to transfer large groups of data at high data rates. For example, the HyperTransport™ Specification specifies data transfer between discrete components (e.g., between a microprocessor and a PCI bridge) in data groups (packets) of up to 64 bytes, at prescribed data rates of 400 Megabits per second (Mbs) up to 2.0 Gigabits per second (Gbs) per wire.

Such high speed bus architectures are based on a sending device and a receiving device each using a corresponding local clock to provides a corresponding timing reference for internal data processing logic. Accordingly, communications internal to each device are based on the corresponding local clock. Hence, each device in a computing system may be configured to generate and transmit communications to other devices in the computing system based on the corresponding local clock of the transmitting device.

Devices in the computing system may be configured to operate in either a synchronous data communication mode or an asynchronous data communication mode. In the synchronous mode, the local clocks of the respective transmitting and receiving devices are derived from a common time base. Thus, the transmission and receipt of data is synchronous to the common time base, although the core clocks in the transmitting and receiving devices may have different frequencies. Note, however, that despite the common time base, the synchronization of data at the high data rates of 400 Mbs to 2.0 Gbs per wire is not trivial due to skew and phase locked loop (PLL) issues. In synchronous mode, the receiver can rely on the fact that the frequencies of the associated clocks will, when averaged over a long period of time, result in a fixed, simple ratio.

In the asynchronous mode, the local clock in the transmitting device (i.e., the transmitting clock domain) is not derived from the same time base source as the local clock in the receiving device (i.e., the receiving clock domain). Hence, the data may not be received and sampled accurately in the receiving device because the receiver cannot simply rely on a fixed, simple ratio of clock frequencies as described above.

Hence, the problem being addressed, in both synchronous and asynchronous mode, can be described as follows. Data is transmitted in one clock domain, and latched in a receiver based on a clock driven from the transmitter. The goal is to read at the data in the receiver, with the lowest possible latency. However, if the data is read too closely to the point where the data was latched, the data will be inaccurate ("bad data") due to metastability effects. Hence, there is a need to be able to drive the synchronized data out into the receiver clock domain at the earliest possible safe time.

U.S. Patent Application Publication No. US 2002/0087909 by Hummel et al. describes a low latency synchronization of asynchronous data, where the frequency of the transmit clock domain is calculated based on the receipt of transmit data at a determined data rate. In particular, Hummel et al. utilizes a clock and data recovery unit configured for generating a synchronization (sync) signal: the synchronization signal is generated based on detecting an asynchronously-transmitted synchronization pattern that has a prescribed start sequence, as well as a prescribed termination (end) sequence; the synchronization signal is then supplied to a synchronizer and load pointer logic that controls a memory location pointer for a receive FIFO buffer. The synchronizer is configured to initialize and synchronize an unload pointer (used for reading a data from a specified location in the receive FIFO buffer) in a manner that minimizes errors due to instability. The unload pointer is initially offset by initial offset logic configured for estimating latency based on the synchronization signal, causing the unload pointer to be moved toward the load pointer to compensate for the estimated latency introduced by the synchronizer.

However, the estimated latency calculated by the device of Hummel et al. assumes an arbitrary frequency for the transmit clock domain; hence, the synchronization signal has limited precision in estimating the latency of the synchronizer. Consequently, substantial logic is need to identify the arbitrary frequency, and calculate the minimum safe time to unload the data.

In addition, the U.S. Patent Publication by Hummel et al. does not contemplate problems encountered by integrated circuit testers (i.e., chip testers) in providing a deterministic test of a receiver device. In particular, chip tester requirements often specify that the behavior of an integrated circuit tested under the conditions imposed by the chip tester must be fall within precise test parameters. However, the circuit may be capable of exhibiting multiple possible behaviors under these varying test conditions, each of which is a correct behavior. The tester, however, is only capable of checking for one specific pattern, and will consider all other behaviors failures, even if functionally the behavior is valid.

Hence, there is a concern that an integrated circuit may encounter "false failures" due to limited accepted patterns in chip test conditions.

SUMMARY OF THE INVENTION

There is a need for an arrangement that enables data to be read in a new clock domain at a minimum safe latency (i.e., the minimum latency without suffering metastability effects).

There is a need to be able to read data, having been obtained from across an asynchronous boundary, at the earliest possible safe time for minimum safe latency.

There also is a need for an arrangement that enables a receive buffer circuit, implemented on an integrated circuit, to provide testability for a synchronizer in the receive buffer circuit by a chip tester, an a manner that guarantees deterministic behavior within prescribed test requirements of the chip tester.

These and other needs are attained by the present invention, where data can be read in a new clock domain at a minimum safe latency based on identifying that a receive clock from a transmitting node is configured at operating only at prescribed available frequencies. A receive buffer circuit includes buffer control logic configured for reading a selected number of the buffer entries based on a detected number of receive clock edges within one local clock cycle. Valid data is identified based on the number of clock edges exceeding a selected threshold. A selected pointer offset is obtained from a lookahead table, specifying multiple pointer offsets for accommodating latency encountered at respective prescribed available frequencies, based on matching a determined frequency to one of the prescribed available frequencies. The selected pointer offset is added to a read pointer to offset the latency encountered from edge detection.

Hence, a more efficient implementation of a receive buffer circuit can be attained based on configuring the receive buffer circuit to operate only within the prescribed available frequencies. In addition, the selected threshold is selected from available thresholds based on the operational mode of the receive buffer circuit, enabling relaxed thresholds to be employed for deterministic testing.

One aspect of the present invention provides a receive buffer circuit having a data buffer, a multi-phase clock generator, an edge detection module, and buffer control logic. The data buffer is configured for latching a received data word in response to any edge transition on one of a first receive clock and a second receive clock. The first receive clock has a corresponding first phase at a prescribed frequency and the second receive clock has a corresponding second phase at the prescribed frequency, the second phase having a phase difference of one fourth of a clock cycle relative to the first phase. The prescribed frequency is one of a group of prescribed available frequencies. In addition, the received data words latched within the clock cycle of the first receive clock form a corresponding buffer entry.

The multi-phase clock generator is configured for generating first, second, third and fourth secondary receive clock signals at a second frequency, at most one half the prescribed frequency, and having respective phases based on the first receive clock and the second receive clock. The first and third secondary receive clock signals have respective phases relative to the first and second phases, respectively, and the second and fourth secondary clock signals having respective phases relative to the inverses of the first and second phases, respectively.

The edge detection module is configured for detecting a first number of clock edges of the first, second, third, and fourth secondary receive clock signals having occurred within a clock cycle of a local clock, where the local clock has a frequency greater than twice the second frequency.

The buffer control logic is configured for reading a selected number of the buffer entries from the data buffer based on the first number of clock edges having occurred within the clock cycle of the local clock. The buffer control logic includes an edge counter configured for incrementing a stored value in response to the first number of clock edges. The buffer control logic also includes a lookahead table having a plurality of entries specifying the prescribed available frequencies and respective pointer offsets. Each pointer offset represents a corresponding latency encountered between latching the buffer entry in the data buffer at the corresponding prescribed available frequency and detection of the corresponding edges by the edge detection module. The lookahead table is configured for incrementing the edge counter by a selected one of the pointer offsets based on a determined frequency, determined as matching a corresponding one of the prescribed available frequencies. The buffer control logic also includes threshold logic configured for identifying a presence of valid data in the data buffer based on the stored value of the edge counter exceeding a selected prescribed threshold from a plurality of available thresholds. In response to the identified presence of valid data, the threshold logic is configured for causing the selected number of the received data words to be read from the data buffer, and decrementing the edge counter by the selected number of the received data words, the selected number of the received data words corresponding to the selected prescribed threshold.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein:

FIG. 5 is a diagram illustrating in detail the lookahead table of FIG. 4, according to an embodiment of the present invention.

BEST MODE FOR CARRYING OUT THE INVENTION

The disclosed embodiment is directed to an integrated circuit, for example a microprocessor or a device that interfaces with the microprocessor via a high-speed link such as a HyperTransport™ link, having a receive buffer circuit configured for outputting latched data signals based on synchronization between receive clocks generated by a transmitting clock domain, and a local clock generated within a receiver clock domain.

Figure 1:
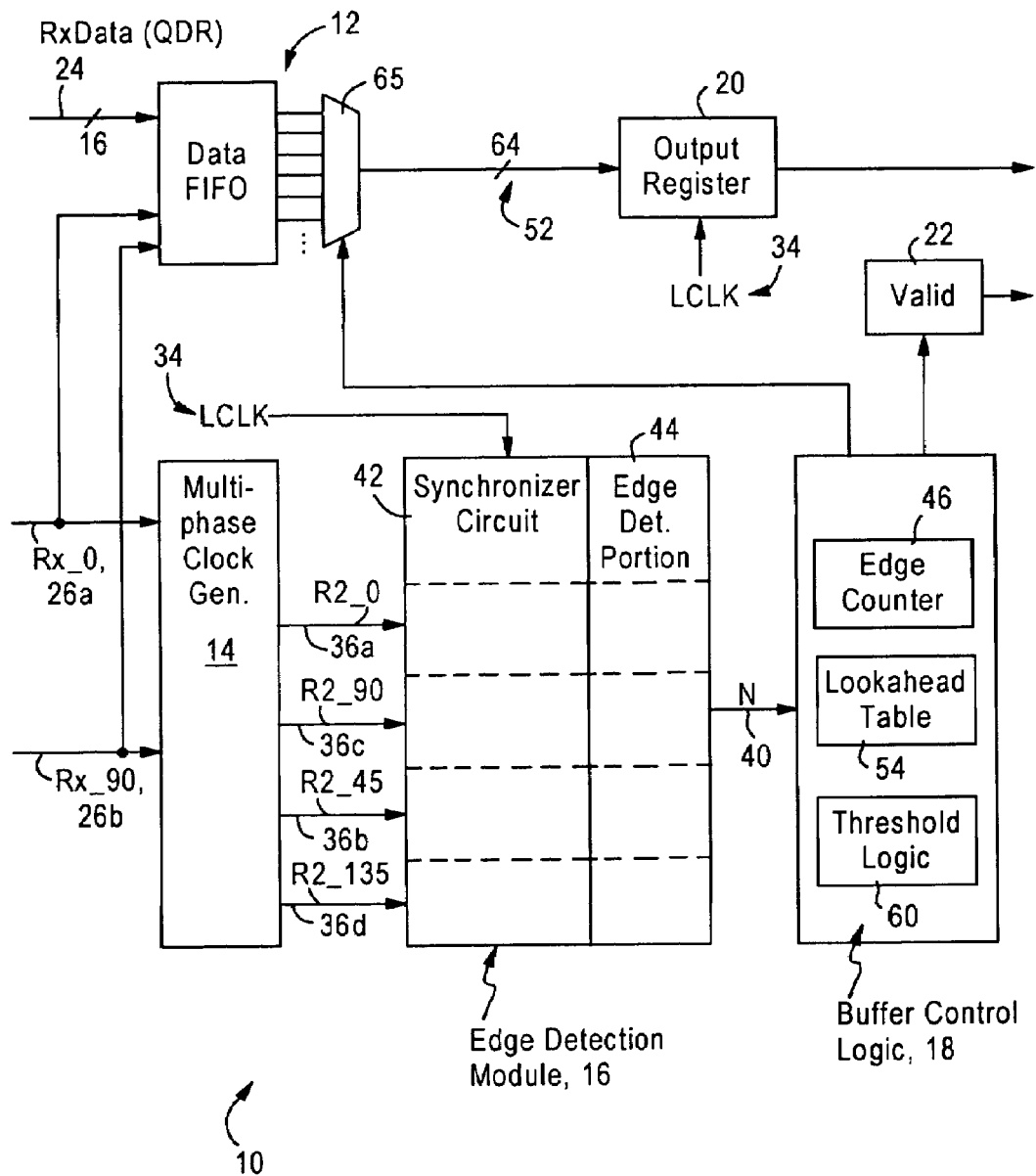
FIG. 1 is a block diagram illustrating the receive buffer circuit according to an embodiment of the present invention.

FIG. 1 is a diagram illustrating a receive buffer circuit 10 having a data buffer 12, a multi-phase clock generator 14, an edge detection module 16, and buffer control logic 18. The receive buffer circuit also includes an output register 20 configured for storing a 64-bit buffer entry output from the data buffer 12, and a valid bit register 22 configured for identifying the presence of valid data in the output register 20.

The First-In-First-Out (FIFO) buffer 12 is configured for receiving high speed data (RxDATA) via a parallel bus 24, for example from a HyperTransport™ bus physical layer transceiver (PHY) configured for dividing an input data rate by two, causing an 8-bit link to be downconverted to a 16-bit link operating at half the frequency of the 8-bit link. In particular, the parallel bus 24 is configured for supplying the data RxDATA based on a first receive clock (Rx_0) 26*a* and a second receive clock (Rx_90) 26*b*. As illustrated in FIG.

3, the first receive clock (Rx_0) 26a and the second receive clock (Rx_90) 26b have the same frequency, and a phase difference (PD) 30 of one fourth of a clock cycle (i.e., 90 degrees). The quad data rate (QDR) operates such that a received data word is valid data on the data bus 24 at each edge transition 28 of the first receive clock (Rx_0) 26a or the second receive clock (Rx_90) 26b, illustrated in FIG. 3.

Hence, the data buffer 12 is configured for latching a received 16-bit data word (RxData), supplied on the 16-bit bus 24, in response to any edge transition 28 on either the first receive clock (Rx_0) 26a or the second receive clock (Rx_90) 26b.

As described below with respect to FIG. 5, the prescribed frequency of the first receive clock (Rx_0) 26a and the second receive clock (Rx_90) 26b is from a group of prescribed available frequencies 32 that are available according to the transmit protocol used to transfer the receive data via the data bus 16. For example, HyperTransport™ permits transfer of data at the clock frequencies of 200 MHz, 300 MHz, 400 MHz, 500 MHz, 600 MHz, 800 MHz, or 1000 MHz, where data is transferred on the clock edges that results in data rates of 400 Mbps, 600 Mbps, 800 Mbps, 1000 Mbps, 1200 Mbps, 1600 Mbps, or 2000 Mbps, respectively; as indicated above, however, the incoming data rate is divided and the data bus width is increased, such that the clock frequency at the FIFO 12 is ¼ the bus frequency (data transfer on both edges of both phases, so 4 times per cycle) resulting in the available frequencies 32 of 50 MHz, 75 MHz, 100 MHz, 125 MHz, 150 MHz, 200 MHz, or 250 MHz.

As described below, the disclosed embodiment is configured for detecting a frequency of the first and second receive clocks 26a and 26b based on detecting clock edges having occurred within a single clock cycle of a local clock (LCLK) 34, and selecting one of the available frequencies 32 as matching the detected frequency.

Consequently, any uncertainty involving detecting a clock edge is resolved by detecting edges across a prescribed depth (i.e., a prescribed number of clock cycles), in combination with setting the detected frequency as corresponding to one of the available frequencies. In cases where the actual number of clock cycles suggests a higher frequency (e.g., 60 MHz) that lies between two adjacent available frequencies (e.g., 50 MHz and 75 MHz), the disclosed embodiment selects the lesser of the two available frequencies: although this selection may cause less efficient operation of the receiver circuit 10, such a selection ensures that instability is not introduced due to the possibility of "false edges", described below.

It should be noted that a transmitter that is nominally transmitting at a particular frequency will in fact have some static error around that frequency, as well as some dynamic error due to jitter. The effects of the transmitter errors affect the resulting sampling in the receiver; in addition, the sampling in the receiver has an associated sampling error since the received signal is sampled across a finite period of time, and due to an additional error based on the LCLK frequency (which forms the basis for the measurement) itself having both static and dynamic frequency errors. All of these error sources accumulate to cause a nominal N MHz clock to appear at the receiver as N±Δ MHz, where Δ is an error delta. For a sparse field of legal frequencies (i.e., prescribed available frequencies), as present in HyperTransport™, these ranges do not overlap, hence there is no ambiguity as to which range to choose. Hence, for values that fall between the ranges, rounding down as illustrated in Table 1 results in the more conservative lookahead value, guaranteeing stability with minimal sacrifice of latency:

TABLE 1

| Nominal Freq | Actual Matching Range | Lookahead Value |
|---|---|---|
| 200 MHz | 0-295 MHz | 4 |
| 300 MHz | 295-395 MHz | 6 |
| 400 MHz | 395-495 MHz | 9 |
| etc. | | |

As illustrated in FIG. 1, the receive buffer circuit 10 further includes a multi-phase clock generator 14. The multi-phase clock generator 14 is configured for generating secondary receive clock signals R2_0 36a, R2_45 36b, R2_90 36c, and R2_135 36d, illustrated in FIGS. 1 and 3, at one half the prescribed frequency of the receive clocks 26a and 26b. Note, however, that more phases may be used at a smaller fraction, if the input clock were at a higher frequency and had to be divided down further to guarantee not missing any edges when sampled in the receiver domain. In other words, the receive clock 26a, 26b needs to be divided down until it is at most one half the frequency of the local clock (LCLK) 34.

The multi-phase clock generator 14 is configured for generating the secondary receive clock signals 36a, 36b, 36c, and 36d at respective phases based on the receive clocks 26a and 26b. In particular, the secondary receive clock signals 36a and 36c have respective positive edges 38 coinciding with the positive edge and negative edge of the receive clock 26a, respectively, and the secondary receive clock signals 36b and 36d have respective positive edges 38 coinciding with the positive edge and negative edge of the receive clock 26b, respectively.

Figure 3:
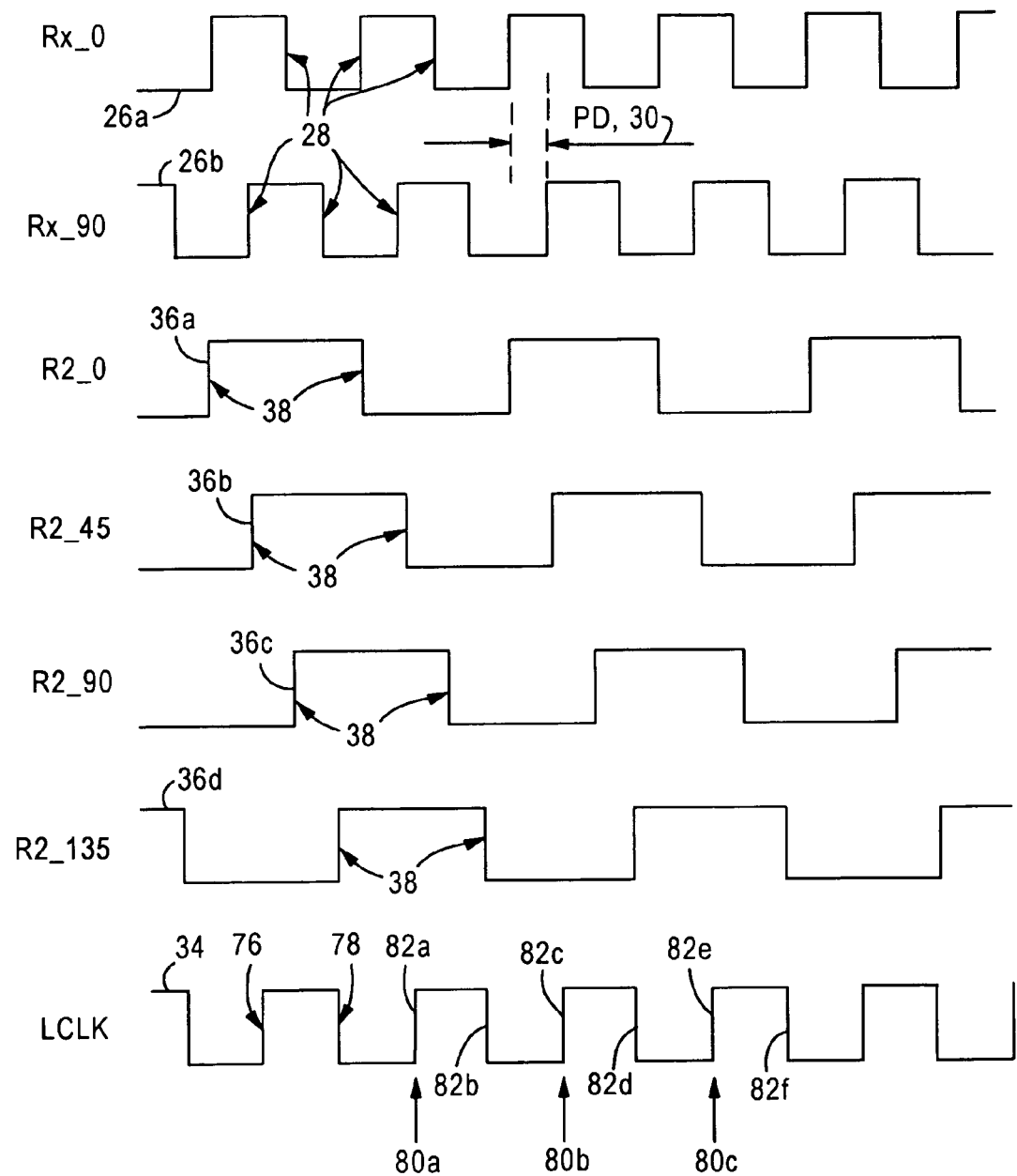
FIG. 3 is a diagram illustrating the first and second receive clocks received by the receive buffer circuit, and the secondary receive clock signals generated by the multi-phase clock generator of FIGS. 1 and 2, and an exemplary local clock signal.

As described below, the receive clock signals 26a and 26b may be implemented at the maximum allowable data rate of 250 MHz; hence, if the local clock 34 is implemented at a frequency sufficient to support the maximum allowable data rate, the generation of the multi-phase signals 36a, 36b, 36c, and 36d enables the local clock signal 34 to sample the edges 38 using a sampling rate that at least twice the frequency of the secondary clock signals, in order to determine the frequency of the clock signals 26a and 26b for synchronization thereof. Note that FIG. 3 illustrates that the local clock 34 is operating at the same frequency as the primary receive clock 26a; as stated earlier, however, the local clock 34 in this embodiment is at least as fast as the primary receive clock, such that the local clock 34 may be implemented at a faster rate than illustrated in FIG. 3.

As described in detail below, the edge detection module 16 is configured for detecting a number (N) 40 of clock edges 38 of the secondary receive clock signals 36a, 36b, 36c, and 36d that have occurred within a single clock cycle of the local clock 34. In particular, the edge detection module 16 includes a synchronizer circuit 42 and an edge detection portion 44. The synchronizer circuit is configured for determining (i.e., detecting) the clock edges of each corresponding clock signal (e.g., 36a) relative to a prescribed depth of latches, based on latching the values of the secondary clock signals 36 at successive intervals, reducing the probability of errors due to metastability to arbitrarily small values. The edge detection portion 44 is configured for detecting the actual edges based on comparing the latched values of the secondary clock signals at successive instances. The detected number (N) 40 of clock edges is used to determine the frequency of the receive clocks 26a and 26b relative to the local clock 34.

The buffer control logic 18 is configured for reading a selected number of the buffer entries from the data buffer 12 based on the number (N) 40 of clock edges 38 having occurred within the clock cycle of the local clock 34. As illustrated in FIG. 1, the buffer control logic 18 includes an edge counter 46, a lookahead table 48, and threshold logic 50.

The buffer control logic 18 is configured for identifying the presence of valid data in the data FIFO 12, as well as ensuring that the data in the output register 20 is valid. In order for the data in the output register 20 to be guaranteed valid, the data FIFO entry being output must have been stable on the 64-bit bus 52 for a sufficient interval to pass through the multiplexer 65 and be latched by the output register according to the local clock domain (LCLK) 34. This time interval is determined based on counting the number of clock edges 28 that have been received, using the clock edges 38 of the secondary receive clock signals 36a, 36b, 36c, 36d that coincide with the clock edges 28 of the receive clock signals 26a, 26b. Hence, each clock edge 28 has a corresponding clock edge 38 (rising and falling) represented by the secondary clock signals 36a, 36b, 36c, and 36d. As illustrated below, the synchronizer circuit 42 synchronizes the edges 38 to both edges 76, 78 of the local clock (LCLK) 34.

The edge counter 46 is configured for storing a counter value that represents a stored data word in the data FIFO 12. As described above, the data FIFO 12 is configured for latching a received data word from the parallel bus 24 in response to an edge 28 by one of the receive clock signals 26a, 26b. Hence, detection of an edge 38 represents a corresponding data word having been stored in the data FIFO 12. Consequently, the counter value in the edge counter represents the number of available data words stored in the data FIFO 12. Hence, the edge counter 46 is configured for incrementing the stored value in response to receiving the detected number (N) 40 of clock edges 38. As described below, the edge counter is decremented in response to the reading of data words from the data FIFO 12. According to the disclosed embodiment, four 16-bit data words (latched according to the quad data rate) form a single 64-bit buffer entry that can be output at a time to the output register 20 via the 64-bit output bus 52; hence, data is preferably output from the data FIFO 12 by outputting four 16-bit data words in parallel, causing a corresponding decrementing of the edge counter 46 by a value of four (4).

As described previously, edge detection based on a synchronizer circuit 42 that has multiple latches to eliminate metastability creates a latency relative to the depth of the synchronizer circuit 42 and the frequency of the local clock 34. This latency is greater than the minimum latency required for safe sampling of the data in the local clock domain, which is the sum of the following: the clock->out time of the FIFO flip-flops, the propagation time through the unload multiplexer, and the setup time to the output register. The difference between these represents wasted time, during which additional data is clocked into the FIFO. Hence, the edge counter 46 is incremented once during data reception with a selected pointer offset, to extract enough data out of the FIFO such that new data is unloaded in the minimum possible time after having been supplied to the FIFO. Unlike the previously-described U.S. Patent Application Publication No. US 2002/0087909 by Hummel et al., however, the disclosed embodiment identifies that the frequency of the receive clocks 26a and 26b will be one of a group of prescribed available frequencies 32, illustrated in FIG. 5.

Hence, the buffer control logic 18 includes a lookahead table 54. As illustrated in FIG. 5, the lookahead table 54 has a plurality of entries 56 specifying the prescribed available frequencies 32 and respective pointer offsets 58. Each pointer offset (e.g., 58a), also referred to as a latency index, represents a corresponding guaranteed minimum number of clock edges between the earliest safe point to look at (i.e., retrieve) the buffer entry (RxDATA) in the data buffer 12 and detection of the corresponding edges 38 by the edge detection module 44 at the corresponding prescribed available frequency (e.g., 200 MHz) 32. In particular, the guaranteed minimum number of clock edges are the minimum number of clock edges 28 which are guaranteed to occur during that latency for a particular frequency of receive clock, and therefore how much additional data is in the FIFO 12 above what the edge counter 46 would indicate.

Figure 4:
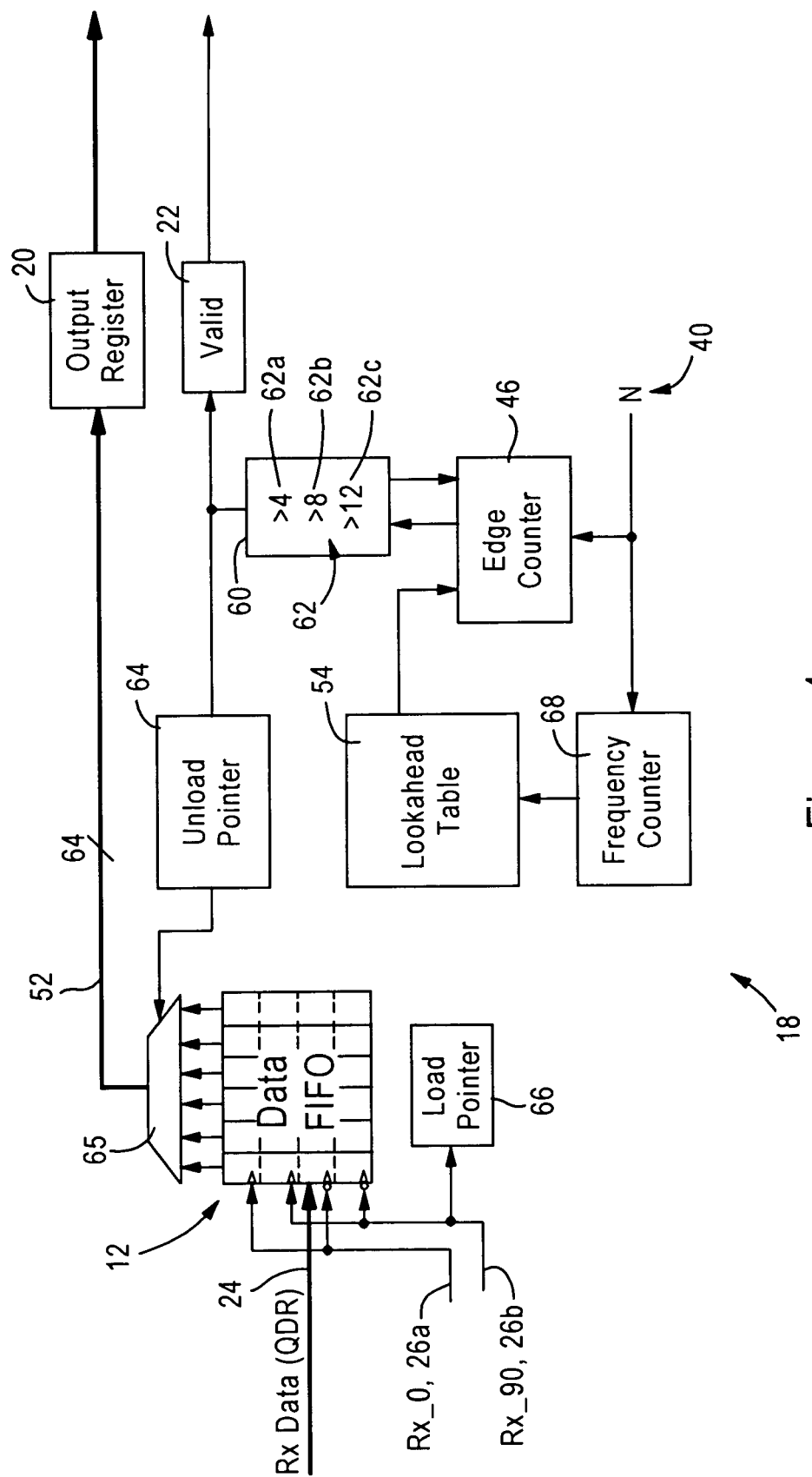
FIG. 4 is a diagram illustrating in detail the buffer control logic of FIG. 1, according to an embodiment of the present invention.

Hence, the lookahead table 54 is configured for incrementing the edge counter 46 by the selected pointer offset (e.g., 58a) based on the determined frequency determined as matching a corresponding one of the prescribed available frequencies (e.g., 200 MHz) 32. As illustrated in FIG. 4, the buffer control logic 18 includes a frequency counter 68 configured determining the frequency of the receive clocks 26a, 26b, based on the number of clock edges 38 having occurred within a prescribed number of clock cycle of the local clock 34. In particular, the clock edges 38 are sampled over a prescribed number of clock cycles 34 (e.g., 32 clock cycles) to enable averaging over a longer sampling window for better precision.

The buffer control logic 18 also includes threshold logic 60. The threshold logic 60 is configured for identifying a presence of valid data in the data buffer 12 based on the stored value of the edge counter 46 exceeding a selected prescribed threshold from a plurality of available thresholds. In response to detecting the presence of valid data, the threshold logic 60 sets the valid bit in register 22 to a "1". Each time the valid bit 22 is set, the unload pointer 64 advances to the next location in the data FIFO 12. A load pointer register 66 is used to indicate the current entry to be loaded; the load pointer register 66 is advanced in response to a falling edge of the receive clock signal Rx_90 26b, representing the last data word latched into the buffer 12. In the case where the threshold is set to indicate more than one cycle's worth of data on the output bus, the valid bit is set for multiple cycles, to read out the amount of data equivalent to the threshold value.

As illustrated with respect to FIG. 4, the threshold logic 60 is configured for identifying valid data in the buffer 12 during normal operation, and during testing operations. In particular, during normal operation the threshold logic 60 selects a minimum threshold "4" 62a from the available thresholds 62; hence, after four data words (equaling a single 64-bit buffer entry) are stored in the buffer 12 in response to the identified presence of valid data, the edge counter 46 is incremented to a value of "4". Consequently, once the stored counter value exceeds the minimum threshold 62a, the threshold logic 60 is configured for causing the selected number of the received data words to be read from the data buffer 12, where the selected number of received data words read from the data buffer 12 corresponds to the selected prescribed threshold (e.g., 62a). The threshold logic 60 also decrements the edge counter 46 by the selected number (e.g., 62a) of received data words to reflect the removal of the data words from the data FIFO 12.

Hence, the threshold logic 60 is configured for selecting the selected prescribed threshold (e.g., 62a) based on a determined operating mode of the receive buffer circuit: in the case of normal operation mode, the threshold logic 60 is configured for selecting the minimum 62*a* of the available thresholds 62 for minimal latency; in addition, the threshold logic 60 is configured for selecting a larger available threshold (e.g., 62*b*, 62*c*) based on the operating mode being a testing mode.

Figure 2:
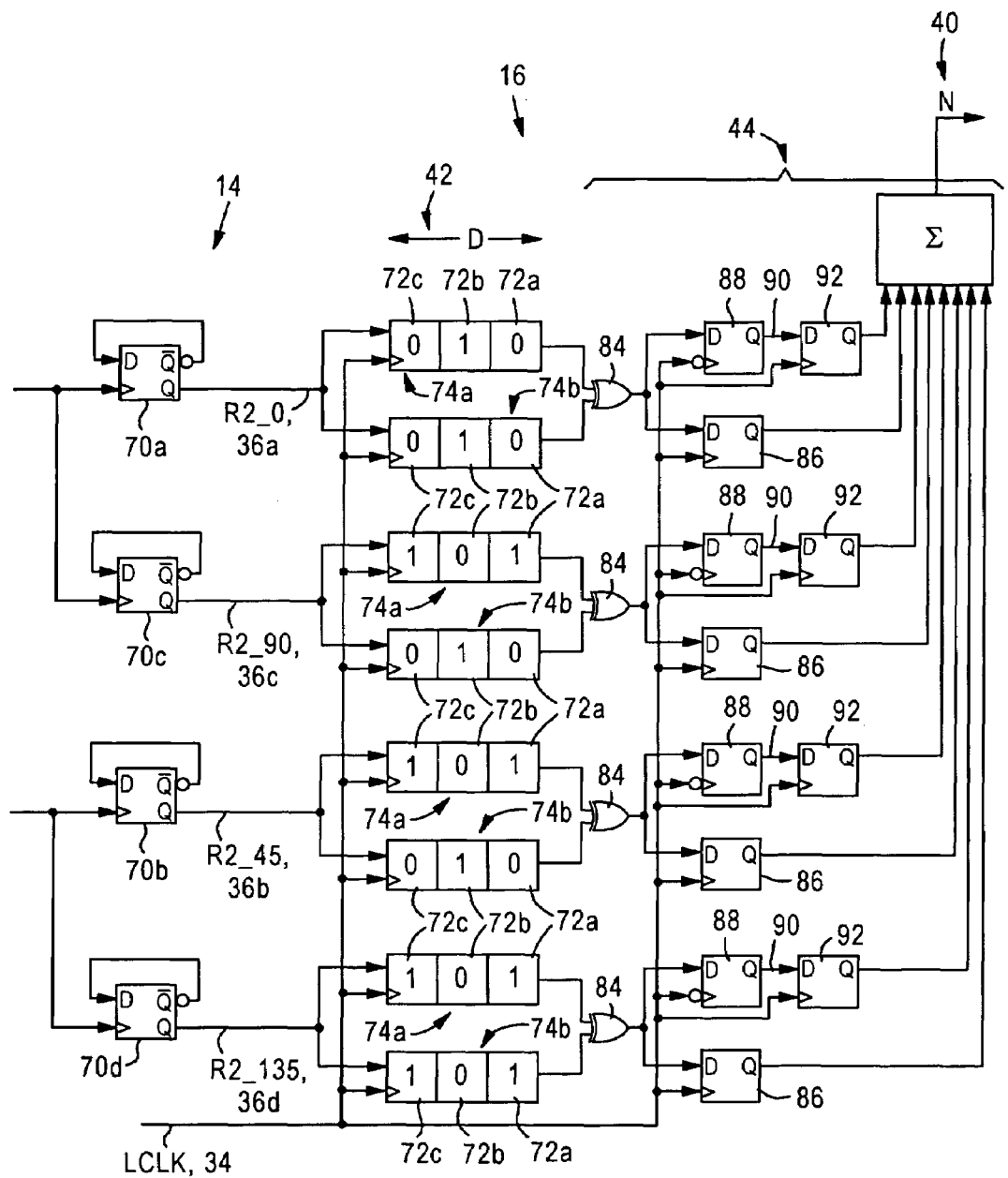
FIG. 2 is a diagram illustrating in further detail the multi-phase clock generator and the edge detection module of FIG. 1.

FIG. 2 is a diagram illustrating in detail the multi-phase clock generation circuit 14 and the edge detection module 16. The clock generation circuit 14 includes latches (e.g., D-flip flops) 70*a*, 70*b*, 70*c*, and 70*d* configured for outputting the secondary clock signals 36*a*, 36*b*, 36*c*, and 36*d* based on the receive clock signals 26*a* and 26*b*. In particular, the positive edge-triggered D-flip flop 70*a* transitions the secondary clock signal 36*a*, and the negative edge-triggered D-flip flop 70*c* transitions the secondary clock signal 36*c*, in response to the receive clock Rx_0 26*a*. The positive edge-triggered D-flip flop 70*b* transitions the secondary clock signal 36*b*, and the negative edge-triggered D-flip flop 70*d* transitions the secondary clock signal 36*d*, in response to the receive clock Rx_90 26*b*, resulting in the sequence of secondary clock signals 36*a*, 36*b*, 36*c*, and 36*d* illustrated in FIG. 3.

The edge detection module 16 includes a synchronizer circuit 42 having a plurality of latches (e.g., D-flip flops) 72 for determining the clock edge 38 of each corresponding secondary receive clock signal relative to a prescribed depth D, illustrated as three LCLK clock cycles based on the depth of three (3) latches 72*a*, 72*b*, and 72*c*. In particular, the synchronizer circuit 42 includes, for each of the secondary receive clock signals 36*a*, 36*b*, 36*c*, and 36*d*, a first group 74*a* of cacaded latches 72*a*, 72*b*, and 72*c* corresponding to the depth D and configured for latching the corresponding secondary clock signal 36 in response to a positive edge 76 of the local clock 34. The synchronizer circuit 42 also includes, for each of the secondary receive clock signals 36*a*, 36*b*, 36*c*, and 36*d*, a second group 74*b* of cacaded latches 72*a*, 72*b*, and 72*c* corresponding to the depth D and configured for latching the corresponding secondary clock signal 36 in response to a negative edge 78 of the local clock 34.

Hence, the groups 74*a* and 74*b* of cascaded latches 72*a*, 72*b*, 72*c* serve as pipelined registers for latching the values of the secondary receive clock signals. FIGS. 2 and 3 illustrate the latches 72*a*, 72*b*, and 72*c* having latched the values of the secondary clock signals 36*a*, 36*b*, 36*c*, and 36*d* across the local clock cycles 80*a*, 80*b*, and 80*c*, where the first group 74*a* are latched on the positive edge 76, and the second group 74*b* are latched on the negative edge 78. Hence, the synchronizer circuit 42 latches each secondary clock signal value into the corresponding latch 72*a* of group 74*a* at event 82*a*, latch 72*a* of group 74*b* at event 82*b*, latch 72*b* of group 74*a* at event 82*c*, latch 72*b* of group 74*b* at event 82*d*, latch 72*c* of group 74*a* at event 82*e*, and latch 72*c* of group 74*b* at event 82*f*.

The edge detection portion 44 of the edge detection module 16 includes exclusive OR gates 84 configured for detecting the edge 38 of the corresponding secondary clock signal 36 in response to a detected logical difference between outputs of the groups 74*a* and 74*b* of cascaded latches, respectively. The edge detection portion 44 also includes first latches 86 configured for latching the output of the corresponding exclusive OR gate 84 in response to the positive edge 76 of the local clock 34 (e.g., at event 82*c*). A second latch 88 latches the output of the exclusive OR gate in response to the negative edge 78 of the local clock 34 (e.g., at event 82*d*), and outputs its latched value 90 to a third latch 92. The third latch 92 is configured for latching the latched value 90 in response to the next positive edge 76 of the local clock (e.g., at event 82*e*), enabling the summation circuit 94 to accumulate the total latched values to identify the number of clock edges (N) 40 having occurred within one clock cycle of the local clock 34.

Hence, the edge detection module 16 is able to identify the number of received clock edges 28, replicated as edges of the secondary clock signals 36, that occur within one clock cycle of the local clock signal 34 and synchronized relative to the local clock domain. Consequently, the buffer control logic 18 is able to reliably identify when the output register 20 includes valid data, based on at least four counted clock edges for latching the four 16-bit data words into the data FIFO 12, plus an additional clock edge (synchronized relative to the local clock 34) for latching the four 16-bit data words as a single 64-bit buffer entry into the output register 20.

As described above, the threshold logic 60 is configured for selecting the minimum threshold (greater than 4) 62*a* during normal operations to minimize latency. However, problems arise during chip testing, namely guaranteeing deterministic operations of the receive buffer circuit 10 on a chip tester configured for testing an integrated circuit chip. Deterministic operation could be guaranteed in theory by implementing the receive clock 26*a* (and 26*b*) and the local clock 34 as simple frequency multiples of each other, and aligning the clocks 26*a*, 26*b*, and 34 in a manner that ensures that the clocks never fall into the metastability window of the various synchronizers. In practice, however, such an arrangement is not practical at the normal operating frequencies of the clocks (at specified clock rates), especially due to errors in clock edge placement by the chip testers, as well as process and operational variations in latency in the electrical paths from the chip pins to the internal circuitry.

According to the disclosed embodiment, the threshold logic 62 provides alternative thresholds 62*b*, 62*c* that causes the value of the edge counter 46 to be checked less frequently, enabling the edge counter 46 to accumulate more valid edges before the contents of the output register 20 are deemed valid, followed by reading several buffer entries in sequence. Hence, the threshold logic 60 effectively operates by assuming the buffer entry is a larger data word (e.g., eight 16-bit data words for threshold 62*b* or twelve 16-bit data words for threshold 62*c*), and utilizing more than a single local clock cycle 34 to read the data from the FIFO 12.

Consequently, by selecting a higher threshold 62*b* or 62*c* for testing modes, the requirement for identifying a precise number of clock edges 38 within a single clock cycle 80 of the local clock 34 is relaxed, providing a larger alignment window for a chip tester to align the clocks 26*a*, 26*b* relative to the local clock 34.

According to the disclosed embodiment, a low-latency receive buffer circuit determines a pointer offset based on a prescribed set of stored pointer offsets relative to prescribed available frequencies, eliminating the necessity of real-time offset calculation or real-time determination of an arbitrary frequency of a received clock signal. In addition, the selection of a threshold based on operational modes enables synchronization to be performed deterministically on a chip tester, resulting in more precise testing and better production yields.

As apparent from the foregoing, the illustrated values for the latency indexes 58 and the thresholds 62 can be modified as needed for implementation.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A receive buffer circuit comprising:

a data buffer configured for latching a received data word in response to any edge transition on one of a first receive clock and a second receive clock, the first receive clock having a corresponding first phase at a prescribed frequency and the second receive clock having a corresponding second phase at the prescribed frequency, the second phase having a phase difference of one fourth of a clock cycle relative to the first phase, the prescribed frequency being one of a group of prescribed available frequencies, the received data words latched within the clock cycle of the first receive clock forming a corresponding buffer entry;

a multi-phase clock generator configured for generating first, second, third and fourth secondary receive clock signals at a second frequency that is at most one half the prescribed frequency and having respective phases based on the first receive clock and the second receive clock, the first and third secondary receive clock signals having respective phases relative to the first and second phases, respectively, and the second and fourth secondary clock signals having respective phases relative to the inverses of the first and second phases, respectively;

an edge detection module configured for detecting a first number of clock edges of the first, second, third, and fourth secondary receive clock signals having occurred within a clock cycle of a local clock, the local clock having a frequency greater than twice the second frequency; and buffer control logic configured for reading a selected number of the buffer entries from the data buffer based on the first number of clock edges having occurred within the clock cycle of the local clock, the buffer control logic including:

(1) an edge counter configured for incrementing a stored value in response to the first number of clock edges, (2) a lookahead table having a plurality of entries specifying the prescribed available frequencies and respective pointer offsets, each pointer offset representing a corresponding latency encountered between latching the buffer entry in the data buffer at the corresponding prescribed available frequency and detection of the corresponding edges by the edge detection module, the lookahead table configured for incrementing the edge counter by a selected one of the pointer offsets based on a determined frequency determined as matching a corresponding one of the prescribed available frequencies, and (3) threshold logic configured for identifying a presence of valid data in the data buffer based on the stored value of the edge counter exceeding a selected prescribed threshold from a plurality of available thresholds, wherein in response to the identified presence of valid data:

(a) the threshold logic is configured for causing the selected number of the received data words to be read from the data buffer, the selected number of the received data words corresponding to the selected prescribed threshold, and (b) the threshold logic is configured for decrementing the edge counter by the selected number of the received data words.

2. The receive buffer of claim 1, wherein the threshold logic is configured for selecting the selected prescribed threshold based on a determined operating mode of the receive buffer circuit, the threshold logic selecting a minimum of the available thresholds based on the operating mode being a normal operation mode, the threshold logic selecting a larger of the available thresholds based on the operating mode being a testing mode.

3. The receive buffer circuit of claim 1, wherein the edge detection module includes a synchronizer circuit having a plurality of latches for determining the clock edge of each corresponding secondary receive clock signal relative to a prescribed depth.

4. The receive buffer circuit of claim 3, wherein the synchronizer circuit includes, for each of the secondary receive clock signals:

a first group of cacaded latches corresponding to the depth and configured for latching the corresponding secondary clock signal in response to a positive edge of the local clock; and a second group of cascaded latches corresponding to the depth and configured for latching the corresponding secondary clock signal in response to a negative edge of the local clock, the edge detection module configured for detecting the edge of the corresponding secondary clock signal in response to a detected logical difference between first and second outputs of the first and second group of cascaded latches, respectively.

5. The receive buffer circuit of claim 4, wherein the edge detection module further includes, for each of the secondary receive clock signals:

an exclusive OR gate configured for detecting the corresponding logical difference;

a first latch configured for latching an output of the exclusive OR gate in response to the positive edge of the local clock, the first latch outputting a first latched value;

a second latch configured for latching an output of the exclusive OR gate in response to the negative edge of the local clock, the second latch outputting a second latched value, and a third latch configured for latching the second latched value in response to a positive edge of the local clock following the negative edge of the local clock, the third latch outputting a third latched value;

wherein the first and third latched values among the first, second, third and fourth secondary receive clock signals identify the first number of clock edges having occurred within the clock cycle of the local clock.

6. The receive buffer circuit of claim 4, wherein the threshold logic is configured for selecting the selected prescribed threshold based on a determined operating mode of the receive buffer circuit, the threshold logic selecting a minimum of the available thresholds, corresponding to the depth the prescribed depth plus the first latch, based on the operating mode being a normal operation mode, the threshold logic selecting a larger of the available thresholds based on the operating mode being a testing mode.

7. A method in a receive buffer circuit, the method comprising:

latching in a data buffer a received data word in response to any edge transition on one of a first receive clock and a second receive clock, the first receive clock having a corresponding first phase at a prescribed frequency and the second receive clock having a corresponding second phase at the prescribed frequency, the second phase having a phase difference of one fourth of a clock cycle relative to the first phase, the prescribed frequency being one of a group of prescribed available frequencies, wherein the received data words latched within the clock cycle of the first receive clock form a corresponding buffer entry;

generating first, second, third and fourth secondary receive clock signals by a multi-phase clock generator at a second frequency based on the first receive clock and the second receive clock, the second frequency being at most one half the prescribed frequency and having respective phases based on the first receive clock and the second receive clock, the first and third secondary receive clock signals having respective phases relative to the first and second phases, respectively, and the second and fourth secondary clock signals having respective phases relative to the inverses of the first and second phases, respectively;

detecting, by an edge detection module, a first number of clock edges of the first, second, third, and fourth secondary receive clock signals having occurred within a clock cycle of a local clock, the local clock having a frequency greater than twice the second frequency;

reading a selected number of the buffer entries from the data buffer based on:

(1) determining a frequency based on the first number of clock edges having occurred within the clock cycle of the local clock;

(2) incrementing a stored value in an edge counter in response to detecting the first number of clock edges having occurred within the corresponding clock cycle, (3) outputting, from a lookahead table having a plurality of entries specifying the prescribed available frequencies and respective pointer offsets, a selected one of the pointer offsets based on a determined frequency being determined as matching a corresponding one of the prescribed available frequencies, each pointer offset representing a corresponding latency encountered between latching the buffer entry in the data buffer at the corresponding prescribed available frequency and detection of the corresponding edges by the edge detection module, (4) incrementing the stored value in the edge counter by the selected one pointer offset, and (5) selectively outputting the selected number of the received data words from the data buffer based on a presence of valid data in the data buffer based on the stored value of the edge counter exceeding a selected prescribed threshold from a plurality of available thresholds, wherein the selected number of the received data words corresponds to the selected prescribed threshold, and the selectively outputting including decrementing the edge counter by the selected number of the received data words.

8. The method claim 7, wherein the reading further includes selecting the selected prescribed threshold based on a determined operating mode of the receive buffer circuit, the selecting including selecting a minimum of the available thresholds based on the operating mode being a normal operation mode, and selecting a larger of the available thresholds based on the operating mode being a testing mode.

9. The method of claim 7, wherein the detecting step includes determining the clock edge of each corresponding secondary receive clock signal, relative to a prescribed depth, using a synchronizer circuit within the edge detection module and having a plurality of latches for the respective secondary receive clock signals.

10. The method of claim 9, wherein the synchronizer circuit includes, for each of the secondary receive clock signals:

a first group of cacaded latches corresponding to the depth and configured for latching the corresponding secondary clock signal in response to a positive edge of the local clock; and a second group of cascaded latches corresponding to the depth and configured for latching the corresponding secondary clock signal in response to a negative edge of the local clock, the edge detection module configured for detecting the edge of the corresponding secondary clock signal in response to a detected logical difference between first and second outputs of the first and second group of cascaded latches, respectively.

11. The method of claim 10, wherein the edge detection module further includes, for each of the secondary receive clock signals:

an exclusive OR gate configured for detecting the corresponding logical difference;

a first latch configured for latching an output of the exclusive OR gate in response to the positive edge of the local clock, the first latch outputting a first latched value;

a second latch configured for latching an output of the exclusive OR gate in response to the negative edge of the local clock, the second latch outputting a second latched value, and a third latch configured for latching the second latched value in response to a positive edge of the local clock following the negative edge of the local clock, the third latch outputting a third latched value;

wherein the first and third latched values among the first, second, third and fourth secondary receive clock signals identify the first number of clock edges having occurred within the clock cycle of the local clock.

12. The method of claim 10, wherein the reading includes selecting the selected prescribed threshold based on a determined operating mode of the receive buffer circuit, including selecting a minimum of the available thresholds, corresponding to the depth the prescribed depth plus the first latch, based on the operating mode being a normal operation mode, and selecting a larger of the available thresholds based on the operating mode being a testing mode.

* * * * *